Figure 9:
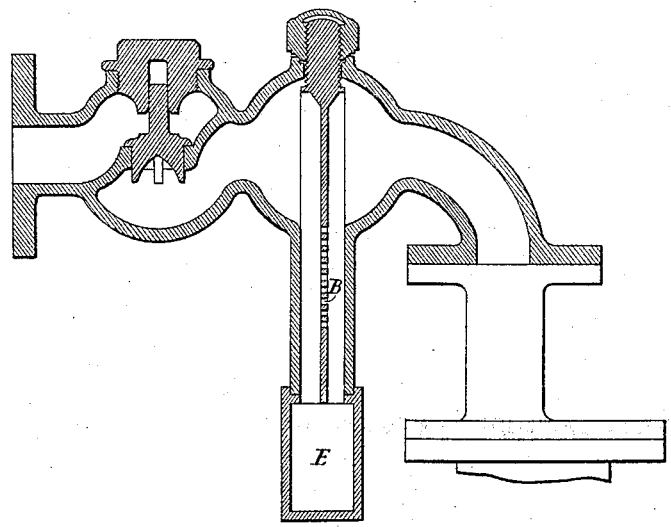

(No Model.) 3 Sheets—Sheet 1.
J. KIRKALDY.
APPLIANCE FOR PREVENTING DIRT FROM PASSING INTO PIPES.
No. 326,569. Patented Sept. 22, 1885.
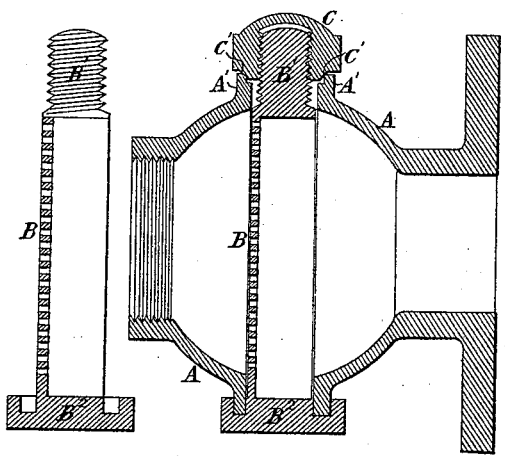
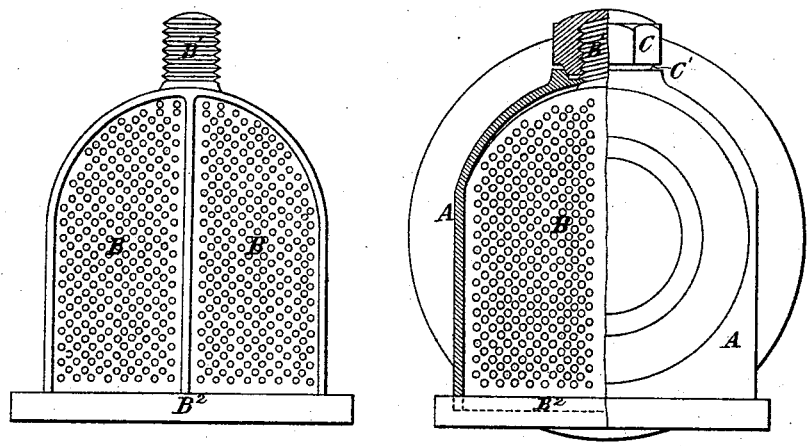
Witnesses
James Young.
Allan McLane West.
Inventor
John Kirkaldy
By Baldwin Hopkins & Peyton (No Model.) 3 Sheets—Sheet 2.
J. KIRKALDY.
APPLIANCE FOR PREVENTING DIRT FROM PASSING INTO PIPES.
No. 326,569. Patented Sept. 22, 1885.
Fig. 5. Fig. 6.
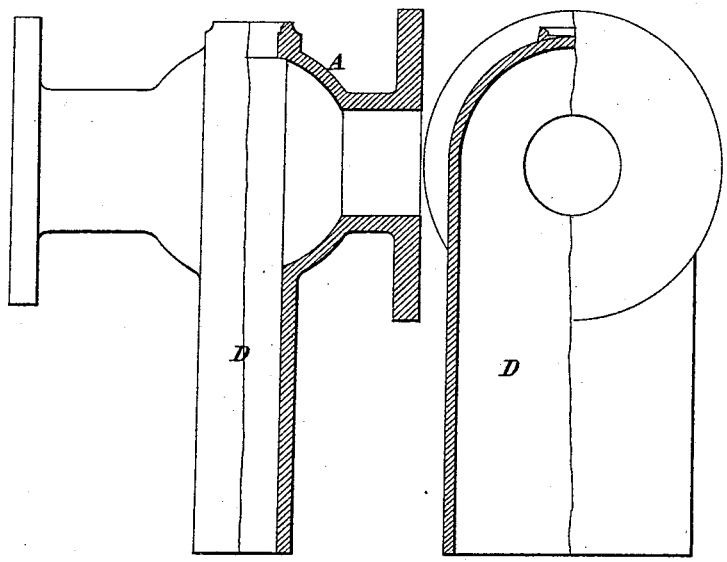
Fig. 7. Fig. 8.
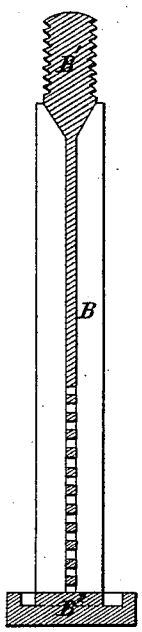 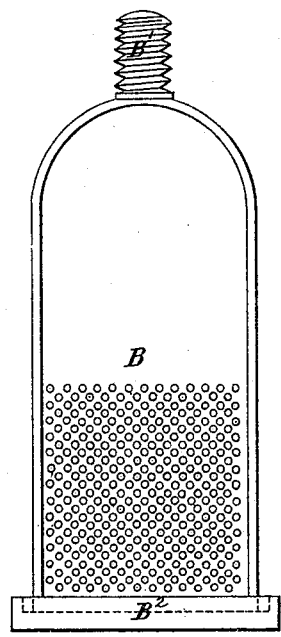
Witnesses
James Young.
Ellen McLane Abert
Inventor
John Kirkaldy
By Attys
Baldwin, Hopkins & Peyton.

(No Model.) 3 Sheets—Sheet 3.

J. KIRKALDY.
APPLIANCE FOR PREVENTING DIRT FROM PASSING INTO PIPES.

No. 326,569. Patented Sept. 22, 1885.

UNITED STATES PATENT OFFICE.

JOHN KIRKALDY, OF 40 WEST INDIA DOCK ROAD, COUNTY OF MIDDLESEX, ENGLAND.

APPLIANCE FOR PREVENTING DIRT FROM PASSING INTO PIPES.

SPECIFICATION forming part of Letters Patent No. 326,569, dated September 22, 1885.

Application filed April 28, 1885. (No model.)

*To all whom it may concern:*

Be it known that I, JOHN KIRKALDY, a subject of the Queen of Great Britain, residing at 40 West India Dock Road, in the county of Middlesex, England, engineer, have invented Improved Appliances for Preventing Dirt from Passing into Pipes or Passages Used for Conveying Steam, Water, or other Fluid, and for the Prevention of Priming, of which the following is a specification.

This invention has more especially for its object to provide an appliance for preventing the entrance of dirt of any kind into tubular surface condensers or steam-boilers in which the tubular surface is composed of helical coils of tube; but it is also applicable in other cases where it is desired to prevent the passage of dirt through other pipes or passages used for conveying steam, water, or other fluid. It can also be used advantageously for the prevention of priming in steam-boilers used for supplying steam to steam-engines—that is, to hinder water being carried over with the steam to the cylinders of the engine. For this purpose I employ a perforated partition or grating placed across a chamber provided with inlet and outlet passages, one on one side and the other one the opposite side of the grating, so that the steam, water, or other fluid in its passage through the chamber has to pass through the perforations.

In order that the grating may from time to time be readily removed to clear off from it any dirt which it may have arrested, I make the grating as a slide, which can be passed endwise into its place within the chamber through an opening at one of its ends. The inner end of the slide I provide with a screw-bolt extending from it to pass through a hole in the end of the chamber opposite to that end from which the slide is inserted, and onto the end of the bolt which protrudes from the chamber I screw a nut, the inner end of which I make somewhat conical to fit into a corresponding recess on the exterior of the chamber, so that when screwed up it makes a steam-tight joint without packing. The nut also I make as a cap-nut to prevent escape of steam or fluid between the screw and the screw-thread in the nut. The opposite end of the slide I form with a flange around it to be drawn against a corresponding surface on the exterior of the chamber or casing, and thereby form a tight joint.

The perforations in the transverse partition or grating may either be immediately between the inlet and outlet passages of the chamber, or the chamber may extend downward or in other direction, and the perforations be formed in the portion of the transverse partition which is within this projecting portion of the chamber, so that the steam or other fluid, as it first enters the chamber, may come against a flat unperforated plate, and the momentum of any solid matters carried along with the steam or other fluid be thereby arrested and allowed to drop to the bottom of the chamber, from which they can be removed from time to time by withdrawing the slide. In some cases I cast the shell or casing of the chamber in one piece with another chamber in which a non-return valve or stop-valve is fitted.

The drawings hereunto annexed show examples of dirt-arresters constructed in the manner above described.

Figure 10:
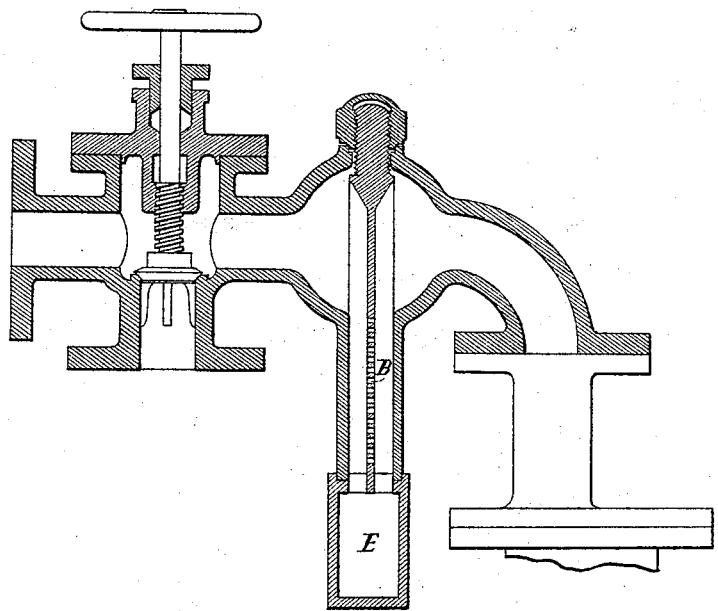

Figure 1 shows a longitudinal section of one form of the dirt-arrester, and Fig. 2 is an end view, one half partly in section, of the same. Fig. 3 is a transverse section, and Fig. 4 face view of its perforated partition or grating. Fig. 5 is a side elevation, one-half in section, and Fig. 6 an end view, one-half in section, of the outer casing of another form of the dirt-arrester, in which a settling-chamber or catch-pit is provided, in which the matters arrested by the grating may be deposited. Fig. 7 is a transverse section, and Fig. 8 a face view, of the grating for the same. Fig. 9 is a longitudinal section of another form of the dirt-arrester, in which the outer shell is cast in one piece with the shell or casing of a non-return valve. Fig. 10 is a longitudinal section of the dirt-arrester, having its shell cast in one piece with the shell or casing of a stop-valve.

A is the outer shell of the dirt-arrester. In Fig. 1 it is shown to be formed at one end with a flange and at the other end with a tubular projection having an internal screw-thread cut in it for inlet and outlet pipes to be secured to it; but other ways of coupling the inlet and outlet of the dirt-arrester to inlet and outlet pipes might be adopted.

B is the perforated partition or grating extending across the interior of the hollow shell A. Its side edges fit against the sides of the shell. At the top it is formed with a screw-stem, B', to project up through a short tubular projection, A', which stands up from the top of the shell. Onto the screw-stem is screwed a cap-nut, C, the under side of which is made conical, as shown at C', to fit within the mouth of the projection A', which is correspondingly coned. In this way a tight joint can be obtained without the use of packing. At the bottom of the shell is a rectangular opening, through which the perforated grating can be slid into or out of its place in the shell.

The opening through which the grating is inserted and withdrawn serves to discharge the accumulated dirt when the grating is removed.

The bottom of the grating is formed with a flat plate, B², at right angles to it, which covers over and extends on all sides beyond the rectangular opening. In its upper face is a groove into which is fitted the lower end of the portion of the shell through which this rectangular opening is formed, and a tight joint is thereby secured.

Should the perforations of the partition or grating become choked it is simply necessary to unscrew the nut C to be able to remove the grating through the rectangular opening in the bottom of the shell. The grating and interior of the shell can then be quickly cleaned and the grating put back again into its place.

In the construction shown at Figs. 5, 6, 7, and 8 it will be seen that the shell is formed with a chamber, D, extending downward to form a catch-pit, in which the dirt arrested by the perforated grating may collect. The partition B is, as shown, carried down to the bottom of the chamber D, and the perforations are formed through its lower half.

In the construction shown at Fig. 9 still further provision is made for the reception of any matters which may be arrested by the grating. A chamber, E, is formed at the bottom of the partition B, into which any dirt arrested by the partition can drop through slits formed through the top of the chamber, as shown. The shell of this dirt-arrester is also, as shown, cast in one piece with the shell or casing of a non-return valve.

The construction shown at Fig. 10 differs only from that shown at Fig. 9 in that the shell of the dirt-arrester is cast in one piece with the shell or casing of an ordinary stop-valve.

Dirt-arresters constructed as above described can be used for preventing solid matters being carried by the feed-water to the boilers of steam-engines, or for preventing priming—that is, the carrying over of water along with the steam passing from a boiler—or for preventing solid matters being carried along with the exhaust-steam from a steam-engine into the condenser, and is especially useful when the condenser is a tubular surface condenser in which the tubular surface is composed of helical coils of tube. They can also be used in a variety of other cases wherever it is desired to arrest the passage of solid matter.

Having now particularly described and ascertained the nature of my said invention, and in what manner the same is to be performed, I declare that what I claim is—

1. The combination of the casing or chamber having the inlet and outlet openings and the dirt-discharging opening, and the perforated partition secured to and crossing the interior of the casing and removable by way of the dirt-discharging opening, substantially as and for the purpose set forth.

2. The combination of the shell A, perforated partition B, screw-stem B', plate B², and cap-nut C, substantially as described.

3. The combination of the shell A, perforated partition B, screw-stem B', plate B², cap-nut C, and cone-surface C', substantially as described.

4. The combination of the shell A, perforated partition B, screw-stem B', plate B², nut C, and chamber D, or chambers D and E, substantially as described.

JOHN KIRKALDY.

Witnesses:
 W. J. NORWOOD,
 WALTER JAMES SKERTEW,
*Clerks to Messrs. Scorer & Harris, 17 Gracechurch St., London, E. C.*